United States Patent
Fukuda et al.

(10) Patent No.: US 9,902,384 B2
(45) Date of Patent: Feb. 27, 2018

(54) HYDRAULIC SYSTEM AND WORK MACHINE

(71) Applicant: KUBOTA CORPORATION, Osaka-shi (JP)

(72) Inventors: Yuji Fukuda, Sakai (JP); Kazuyoshi Arii, Sakai (JP)

(73) Assignee: KUBOTA CORPORATION, Osaka-Shi (JP)

( * ) Notice: Subject to any disclaimer, the term of this patent is extended or adjusted under 35 U.S.C. 154(b) by 17 days.

(21) Appl. No.: 15/194,574

(22) Filed: Jun. 28, 2016

(65) Prior Publication Data

US 2016/0304071 A1 Oct. 20, 2016

Related U.S. Application Data

(63) Continuation of application No. PCT/JP2015/058701, filed on Mar. 23, 2015.

(30) Foreign Application Priority Data

Mar. 31, 2014 (JP) ................................. 2014-072154

(51) Int. Cl.
*B60T 11/28* (2006.01)
*E02F 9/22* (2006.01)
(Continued)

(52) U.S. Cl.
CPC ................ *B60T 11/28* (2013.01); *A01B 1/00* (2013.01); *B60K 17/10* (2013.01); *B60T 1/12* (2013.01);
(Continued)

(58) Field of Classification Search
CPC .......... B60T 11/28; B60T 1/12; E02F 9/2267; E02F 9/2264; E02F 9/2278; E02F 9/22;
(Continued)

(56) References Cited

U.S. PATENT DOCUMENTS 8,250,862 B1 * 8/2012 Iida ......................... B60T 1/062
180/308
2007/0210643 A1 * 9/2007 Perkins ................... B60T 13/18
303/89

FOREIGN PATENT DOCUMENTS

EP 223686 A1 * 5/1987
JP 03-046554 2/1991
(Continued)

OTHER PUBLICATIONS

International Search Report for corresponding International Application No. PCT/JP2015/058701, dated Jun. 16, 2015.

*Primary Examiner* — Keith J Frisby
(74) *Attorney, Agent, or Firm* — Mori & Ward, LLP

(57) ABSTRACT

A hydraulic system includes a motor. A brake is to be actuated by an operation fluid to brake the motor when a hydraulic pressure is relieved and to release the braking when the hydraulic pressure is applied. A switch valve is to be switched to a first position and to a second position, the first position being provided for relieving the hydraulic pressure from the brake, the second position being provided for applying the hydraulic pressure to the brake. A first fluid tube is to connect the switch valve and the brake. A second fluid tube is connected to the first fluid tube at a connecting portion and communicated with a tank A first throttle is disposed on the second fluid tube. A second throttle is disposed on the first fluid tube and on an upstream side between the connecting portion and the switch valve.

20 Claims, 2 Drawing Sheets

(51) Int. Cl.
| | |
|---|---|
| *A01B 1/00* | (2006.01) |
| *E02F 3/34* | (2006.01) |
| *E02F 9/20* | (2006.01) |
| *F16D 1/00* | (2006.01) |
| *F16H 61/40* | (2010.01) |
| *B60K 17/10* | (2006.01) |
| *F16H 61/44* | (2006.01) |
| *B60T 1/12* | (2006.01) |

(52) U.S. Cl.
CPC .......... *E02F 3/3414* (2013.01); *E02F 9/2083* (2013.01); *E02F 9/22* (2013.01); *E02F 9/226* (2013.01); *E02F 9/2267* (2013.01); *E02F 9/2292* (2013.01); *E02F 9/2296* (2013.01); *F16D 1/00* (2013.01); *F16H 61/40* (2013.01); *F16H 61/44* (2013.01); *E02F 9/2278* (2013.01)

(58) Field of Classification Search
CPC .... E02F 9/226; E02F 9/2083; F16H 61/4157; F16H 61/40
USPC .......................................................... 180/370
See application file for complete search history.

(56) References Cited

FOREIGN PATENT DOCUMENTS

| | | | |
|---|---|---|---|
| JP | 2005-214327 | | 8/2005 |
| JP | 2007271027 | A * | 10/2007 |
| JP | 2010-209637 | | 9/2010 |
| JP | 2014-001609 | | 1/2014 |

\* cited by examiner

HYDRAULIC SYSTEM AND WORK MACHINE

CROSS-REFERENCE TO RELATED APPLICATIONS

The present application is a continuation application of International Application No. PCT/JP2015/058701, filed Mar. 23, 2015, which claims propriety to Japanese Patent Application No. 2014-072154, filed Mar. 31, 2014.The contents of these applications are incorporated herein by reference in their entirety.

BACKGROUND OF THE INVENTION

Field of the Invention

The present invention relates to a hydraulic system and a work machine.

Discussion of the Background

Japanese Unexamined Patent Application Publication No. H03-46554 and Japanese Unexamined Patent Application Publication No. 2010-209637 disclose hydraulic systems for work machines.

SUMMARY OF THE INVENTION

According to one aspect of the present invention, a hydraulic system includes a motor, a brake, a switch valve, a first fluid tube, a second fluid tube, a first throttle, and a second throttle. The brake is to be actuated by an operation fluid to brake the motor when a hydraulic pressure is relieved and to release the braking when the hydraulic pressure is applied. The switch valve is to be switched to a first position and to a second position, the first position being provided for relieving the hydraulic pressure from the brake, the second position being provided for applying the hydraulic pressure to the brake. The first fluid tube is to connect the switch valve and the brake. The second fluid tube is connected to the first fluid tube and communicated with a tank. The first throttle is disposed on the second fluid tube. The second throttle is disposed on the first fluid tube and on an upstream side between the connecting portion and the switch valve.

According to another aspect of the present invention, a work machine includes a motor, a drive device, a brake, a switch valve, a first fluid tube, a second fluid tube, a first throttle, and a second throttle. The drive device is to be driven by the motor. The brake is to be actuated by an operation fluid to brake the motor when a hydraulic pressure is relieved and to release the braking when the hydraulic pressure is applied. The switch valve is to be switched to a first position and to a second position, the first position being provided for relieving the hydraulic pressure from the brake, the second position being provided for applying the hydraulic pressure to the brake. The first fluid tube is to connect the switch valve and the brake. The second fluid tube is connected to the first fluid tube at a connecting portion and communicated with a tank. The first throttle is disposed on the second fluid tube. The second throttle is disposed on the first fluid tube and on an upstream side between the connecting portion and the switch valve.

According to further aspect of the present invention, a hydraulic system includes a motor, a brake, a switch valve, a first fluid tube, a second fluid tube, a first throttle, and a second throttle. The brake is to be actuated by an operation fluid to brake the motor when a hydraulic pressure is relieved and to release the braking when the hydraulic pressure is applied. The switch valve is to switch between a first flowing path through which the hydraulic pressure is relieved from the brake and a second flowing path through which the hydraulic pressure is applied to the brake. The first fluid tube is to connect the switch valve and the brake. The second fluid tube is connected to the first fluid tube and communicated with a tank. The first throttle is disposed on the second fluid tube. The second throttle is disposed on the first fluid tube and on an upstream side between the connecting portion and the switch valve.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
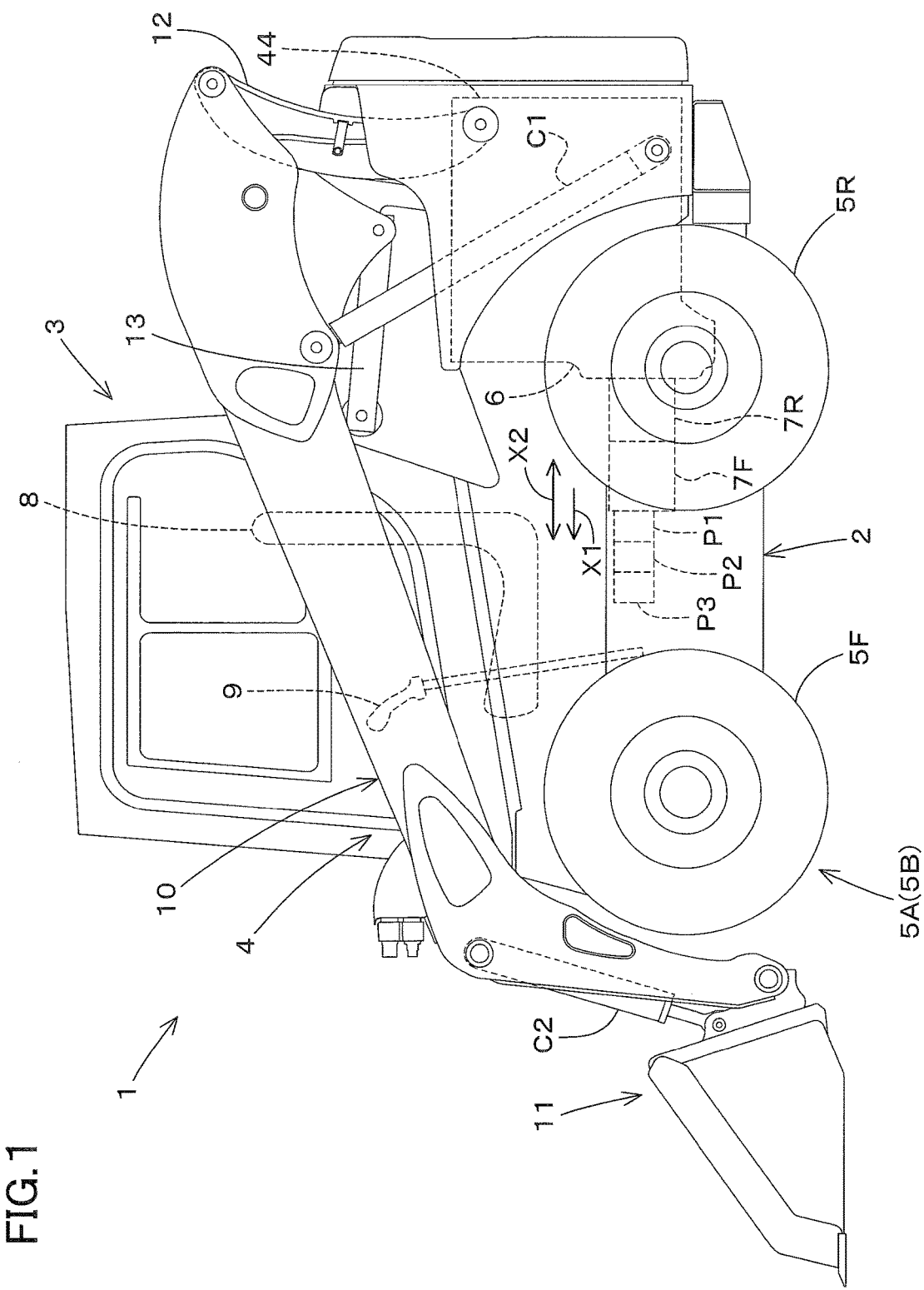
FIG. 1 is a side view of a skid steer loader according to an embodiment of the present invention.

The embodiment will now be described with reference to the accompanying drawings, wherein like reference numerals designate corresponding or identical elements throughout the various drawings. The drawings are to be viewed in an orientation in which the reference numerals are viewed correctly.

FIG. 1 is a skid steer loader 1 exemplified as a work machine (a wheeled construction machine). The skid steer loader 1 includes a machine frame (referred to as a machine body) 2, a cabin 3, an operation device 4, a travel device (a drive device) 5A, and a travel device (a drive device) 5B. The cabin 3 is mounted on the machine frame 2. The operation device 4 is attached to the machine frame 2. The travel device 5A is disposed on a left side of the machine frame 2, and the travel device 5B is disposed on a right side of the machine frame 2.

An engine 44 is mounted on a rear portion in the machine frame 2.

An operator seat 8 is disposed on a rear portion in the cabin 3.

Hereinafter, in the following description of the embodiment, a forward direction (a direction shown by an arrowed line X1 in FIG. 1) corresponds to a direction extending forward (toward a left side of FIG. 1) from an operator sitting on the operator seat 8 of the skid steer loader 1. A backward direction (a direction opposite to the direction shown by the arrowed line X1) corresponds to a direction extending backward (toward a right side of FIG. 1) from the operator. A leftward direction corresponds to a direction extending leftward (from a back side toward a front side of FIG. 1) from the operator. A rightward direction corresponds to a direction extending rightward (from a front side toward a back side of FIG. 1) from the operator.

Two travel levers 9 used for operating the travel devices 5A and 5B are disposed being arranged along a width direction of the machine frame 2, the width direction corresponding to a horizontal direction perpendicular to the forward direction and to the backward direction. One of the travel levers 9 is disposed on a left side of and in front of the operator seat 8, the travel lever 9 disposed on the left side being used for an operation of the travel device 5A disposed on the left side (a travel pump 7F disposed on a front side and described below). The other one of the travel levers 9 is disposed on a right side of and in front of the operator seat 8, the travel lever 9 disposed on the right side being used for an operation of the travel device 5B disposed on the right side (a travel pump 7R disposed on a rear side and described below).

The operation device 4 includes booms 10, a bucket 11, a lift link 12, a control link 13, a boom cylinder C1, and a bucket cylinder C2. One of the booms 10 is disposed on a left side of the machine frame 2, and the other one of the booms 10 is disposed on a right side of the machine frame 2. The bucket 11 is disposed on tip end portions (front end portions) of the booms 10 and thus is capable of being freely swung upward and downward. The lift link 12 and the control link 13 support base portion sides (rear portion sides) of the booms 10. The boom cylinder C1 is a cylinder for moving the booms 10 upward and downward. The boom cylinder C2 is a cylinder C2 for moving the bucket 11 upward and downward.

The bucket 11 is attached to the tip end portions (front end portions) of the booms 10 and thus is capable of being freely attachable to and detachable from the tip end portions of the booms 10. A hydraulic attachment can be attached instead of the bucket 11.

The lift link 12, the control link 13 and the boom cylinder C1 are disposed, corresponding to the booms 10, on each of the left side and the right side of the machine frame 2. Each of the lift links 12 is pivotally supported at an upper portion of the lift link 12 on the rear end portions of the base portions of the booms 10. In addition, each of the lift links 12 is pivotally supported at a lower portion of the lift link 12 on an upper portion of a rear end side of the machine frame 2. The control link 13 is disposed in front of the lift link 12. A rear end side of the control link 13 is pivotally supported on a lower end side in an intermediate portion of each of the base portion sides of the booms 10.

The boom cylinder C1 is supported at an upper portion of the boom cylinder C1 on a front portion of each of the base portion sides of the booms. The boom cylinder C1 is supported at a lower portion of the boom cylinder C1 on a lower portion of a rear end side of the machine frame 2. Stretching and shortening of the boom cylinder C1 swing the booms 10 upward and downward, the booms 10 being supported on the base portion sides of the booms 10 by the lift link 12 and the control link 13, thereby moving tip portion sides of the booms 10 upward and downward.

The bucket cylinders C2 are arranged on the booms 10. Stretching and shortening of the bucket cylinders C2 swing the bucket 11.

In the embodiment, both of the travel devices 5A and 5B employ a wheeled travel device, the wheeled travel device having a front wheel 5F and a rear wheel 5R. A crawler travel device (including a semi-crawler travel device), however, may be employed as the travel devices 5A and 5B.

A pump housing 6 is disposed on a front surface side of the engine 44. Two travel pumps 7F and 7R are arranged adjoining along a front to rear direction X2 in the pump housing 6, the travel pumps 7F and 7R being used for driving the travel devices 5A and 5B. A first pump P1, a second pump P2, a third pump P3 are arranged adjoining in the front to rear direction X2 in front of the travel pump 7F disposed on the front side. The travel pumps 7F and 7R, the first to third pumps P1, P2 and P3 are driven by the engine 44.

The travel pumps 7F and 7R arranged in the front to rear direction respectively drive the travel device 5A disposed on the left side and the travel device 5B disposed on the right side, and are each constituted of a hydraulic pump of variable displacement type, the hydraulic pump employing a swash plate.

The first to third pumps P1, P2 and P3 are each constituted of a gear pump of a constant displacement type. The first pump P1 is used for driving a hydraulic actuator disposed on the operation device 4 or driving a hydraulic actuator of the hydraulic attachment attached to the operation device 4. The second pump P2 is used for increasing supply of the operation fluid. The third pump P3 is used for mainly supplying a control signal pressure.

Figure 2:
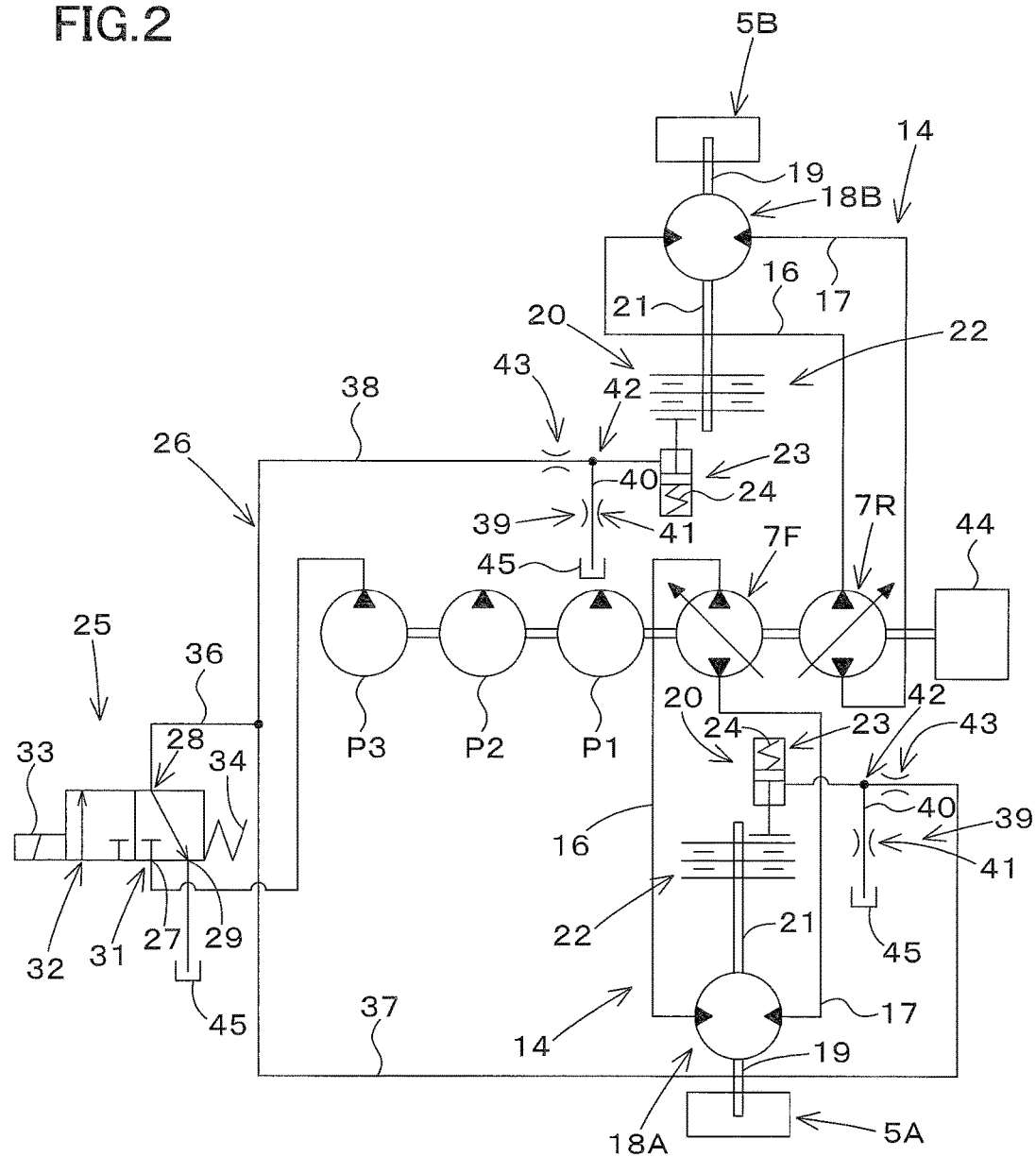
FIG. 2 is a circuit diagram of a hydraulic system according to the embodiment.

As shown in FIG. 2, the travel pumps 7F and 7R constitute a part of an HST (a hydrostatic continuously variable transmission) 14 for driving the travel devices 5A disposed on the left side and the travel unit 5B disposed on the right side. The HST 14 is disposed on the travel device 5A, and another HST 14 is disposed on the travel device 5B. The travel pump 7F is a pump used for driving the travel device 5A. The travel pump 7R is a pump used for driving the travel device 5B.

The HST 14 includes the travel pumps 7F and 7R, a travel motor (a motor) 18A constituted of a hydraulic motor, a travel motor (a motor) 18B constituted of a hydraulic motor. The travel pumps 7F and 7R are connected to the travel motors 18A and 18B by a pair of speed changing fluid tubes 16 and 17, and thus a closed circuit is constituted. In this manner, the travel motors 18A and 18B are driven by discharged fluid from the travel pumps 7F and 7R. In the embodiment, the front wheel 5F and the rear wheel 5R are driven by rotational motive forces outputted from the travel motors 18A and 18B.

In addition, a discharging direction of and a discharging flow rate of the operation fluid discharged from the travel pumps 7F and 7R are changed by changing tilt angles of the swash plates included in each of the HST pumps 7F and 7R. In this manner, the HST is capable of changing a revolution speed (for example, revolutions per minute) and a revolution direction of output shafts, the output shafts being a component of the travel motors 18A and 18B, and thus is capable of driving the slid steer loader 1 forward and backward and of changing a traveling speed of the skid steer loader 1.

As shown in FIG. 2, the skid steer loader 1 includes a negative brake (a brake) 20. The negative brake 20 brakes the travel motors 18A and 18B by using a spring force, the travel motors 18A and 18B being used for driving the travel devices 5A and 5B, and releases the braking by using a hydraulic pressure. The negative brake 20 brakes the travel motors 18A and 18B when the hydraulic pressure is relieved, and releases the braking by supplying the hydraulic pressure. The negative brake 20, meanwhile, is disposed on each of the travel motors 18A and 18B.

The negative brake 20 includes a brake disk 22, a brake cylinder (a hydraulic cylinder) 23 and a brake spring The brake disk 22 is disposed on a brake shaft 21, the brake shaft 21 being disposed on the travel motors 18A and 18B. The brake shaft 21 is driven by the travel motors 18A and 18B, and revolves integrally with an output shaft 19.

The brake cylinder 23 is stretched to press the brake disk 22, and thus brakes the travel motor 18A and 18B. In addition, the brake cylinder 23 is shortened to release the pressing to the brake disk 22, and thus releases the braking to the travel motors 18A and 18B.

The brake spring 24 is incorporated into the brake cylinder 23, and pushes the brake cylinder 23 toward a direction of stretching.

A system for controlling the negative brake 20 includes a brake switch valve (a switch valve) 25 and a hydraulic pressure supplying-discharging fluid tube (referred to as a first fluid tube) 26, the first fluid tube 26 connecting the brake switch valve 25 and the negative brake 20 to each other.

The brake switch valve 25 includes an input port 27, an output port 28 and a tank port 29. The input port 27 accepts input of the operation fluid discharged from the third pump P3. The output port 28 outputs the inputted operation fluid. The tank port 29 is communicated with a tank 45. The brake switch valve 25 includes a brake position (referred to as a first position) 31 and a brake release position (referred to as a second position) 32, the brake position 31 being provided for relieving the hydraulic pressure from the negative brake 20, the brake release position 32 being provided for supplying the hydraulic pressure to the negative brake 20.

In addition, the brake switch valve 25 is constituted of an electromagnetic valve, and is controlled by a control device not shown in the drawings. The brake switch valve 25 is switched to the second position 32 when the solenoid 33 is magnetized. The brake switch valve 25 is switched to the first position 31 by a spring 34 when the solenoid 33 is demagnetized. The solenoid 33 of the brake switch valve 25 is magnetized when a key switch is turned on by an engine key used for starting the engine 44, and is demagnetized when the key switch is turned off.

The first fluid tube 26 includes a fluid tube 36, a branched fluid tube 37 and a branched fluid tube 38, the fluid tube 36 being connected to an output port 28 of the brake switch valve 25 at one end portion of the fluid tube 36, the branched fluid tubes 37 and 38 being branched from the other end portion of the fluid tube 36. The branched fluid tube 37 is connected to the brake cylinder 23 of the negative brake 20, the negative brake 20 being configured to brake the travel motor 18A disposed on the left side. The branched fluid tube 38 is connected to the brake cylinder 23 of the negative brake 20, the negative brake 20 being configured to brake the travel motor 18B disposed on the right side.

In a conventional skid steer loader, the brake switch valve stays at the second position without being switched to the first position because the key switch is held to be on in a case where the skid steer loader stalls an engine. In that case, the third pump stops, a hydraulic pressure of the first fluid tube is relieved by leak of an operation fluid from the brake switch valve 25 and the like, and thus the travel motors 18A and 18B are braked. Thus, the conventional skid steer loader causes a problem that the braking of the travel motors 18A and 18B delays when the engine is stalled.

The skid steer loader 1 according to the embodiment includes a pressure relief circuit 39 configured to relieve a hydraulic pressure of the first fluid tube 26 to the tank 45, thereby improving responsibility of the negative brake 20 in the engine stall.

The pressure relief circuit 39 is disposed on each of the branched fluid tubes 37 and 38 of the first fluid tube 26. The pressure relief circuit 39 is constituted of a pressure relief fluid tube (referred to as a second fluid tube) 40 and a throttle 41 (referred to as a first throttle).

The second fluid tube 40 is connected to the branched fluid tubes 37 and 38 at one end of the second fluid tube 40, and is communicated with the tank 45 at the other end. The second fluid tube 40 is disposed near a hydraulic pressure supplying-discharging port of the brake cylinder 23. To be more detailed, the second fluid tube 40 is connected to a hydraulic pressure outlet-inlet port disposed on a brake body of the negative brake 20 or connected to the branched fluid tubes 37 and 38 at a position near the hydraulic pressure outlet-inlet port, and in this manner a hydraulic pressure is supplied to and discharged from the brake cylinder 23.

The first throttle 41 is incorporated in the second fluid tube 40. It is preferable to provide the first throttle 41 near (in the vicinity of) a connecting portion (a connector) 42 of the second fluid tube 40.

A throttle 43 (referred to as a second throttle) is disposed on an upper stream side being upward from the connecting portion 42 of the second fluid tube 40 in the first fluid tube 26. It is preferable to provide the second throttle 43 near (in the vicinity of) a connecting portion (a connector) 42 of the second fluid tube 40.

The first throttle 41 and the second throttle 43 are each constituted of an orifice throttle or a choke throttle. In addition, a throttle aperture of the second throttle 43 is larger than a throttle aperture of the first throttle 41, or a throttle aperture of the second throttle 43 is equal to a throttle aperture of the first throttle 41.

In the skid steer loader 1, a pressure fluid of the brake cylinder 23 of the negative brake 20 is relieved to the tank 45 through the pressure relief circuit 39 under conditions where the brake switch valve 25 is at the second position 32 and where the engine 44 stalls to stop the third pump P3 stops and thus stops a hydraulic pressure supplied from the brake switch valve 25, and thus the travel motors 18A and 18B are quickly braked.

In a case where the second throttle 43 is not provided, the pressure relief circuit 39 has to relieve all the hydraulic pressure of the first fluid tube 26 between the brake switch valve 25 and the negative brake 20. In this manner, it takes a long time to relieve the hydraulic pressure of the first fluid tube 26 in the case where the second throttle 43 is not provided, for example, in a case where a long hydraulic hose is used for the first fluid tube 26, and thus the braking of the negative brake 20 may delay.

The skid steer loader 1 according to the embodiment however includes the second throttle 43. Thus, the negative brake 20 is activated only by relieving a hydraulic pressure of a downstream side being downward from the second throttle 43 in a case the negative brake 20 is activated by relieving a hydraulic pressure from the pressure relief circuit 39, and thus the negative brake 20 can be quickly activated.

In addition, the hydraulic pressure of the downstream side being downward from the second throttle 43 is determined based on a balance between the first throttle 41 and the second throttle 43. In this manner, the throttle apertures of the first throttle 41 and second throttle 43 are adjusted to set the hydraulic pressure of the downstream side being downward from the second throttle 43 to be lower than the hydraulic pressure supplied from the brake switch valve 25, and thereby a response of activating the negative brake 20 can be improved, the activation being caused by relieving the hydraulic pressure from the pressure relief circuit 39. For example, the hydraulic pressure of the downstream side being downward from the second throttle 43 is set to be the minimum pressure required to release the braking of the negative brake 20 or to be slightly higher than a spring pressure of the brake spring 24.

In addition, the first throttle 41 and the second throttle 43 are disposed near (in the vicinity of) the connecting portion 42 of the second fluid tube 40, and thereby a response of activating the negative brake 20 can be improved, the activation being caused by relieving the hydraulic pressure from the second fluid tube 40.

Moreover, a throttle aperture of the second throttle 43 is larger than a throttle aperture of the first throttle 41, and thus a releasing pressure to release the braking of the negative brake 20 can be ensured.

Furthermore, a throttle aperture of the second throttle 43 is equal to a throttle aperture of the first throttle 41, and thereby the releasing pressure to release the braking of the negative brake 20 can be sufficiently dropped. In this manner, a response of activating the negative brake 20 can be improved, the activation being caused by relieving the hydraulic pressure from the second fluid tube 40.

In addition, an operation fluid discharged from the third pump P3 after being taken from the tank 45 circulates in the following order of the brake switch valve 25, the second throttle 43, the first throttle 41 and the tank 45. In this manner, the operation fluid can be heated up in the first fluid tube 26, and thus the response in a low temperature can be improved.

In the embodiment described above, the travel devices 5A and 5B are exemplified as the drive device. The drive device may be a turn device of a backhoe (a work machine).

Obviously, numerous modifications and variations of the present invention are possible in light of the above teachings. It is therefore to be understood that within the scope of the appended claims, the invention may be practiced otherwise than as specifically described herein.

What is claimed is:

1. A hydraulic system comprising:
a motor;
a brake to be actuated by an operation fluid to brake the motor when a hydraulic pressure is relieved and to release the braking when the hydraulic pressure is applied;
a switch valve to be switched to a first position and to a second position, the first position being provided for relieving the hydraulic pressure from the brake, the second position being provided for applying the hydraulic pressure to the brake;
a first fluid tube to connect the switch valve and the brake;
a second fluid tube connected to the first fluid tube at a connecting portion and communicated with a tank;
a first throttle disposed on the second fluid tube; and
a second throttle disposed on the first fluid tube and on an upstream side between the connecting portion and the switch valve.

2. The hydraulic system according to claim 1, wherein the second throttle is disposed near the connecting portion.

3. The hydraulic system according to claim 2, wherein a throttle aperture of the second throttle is larger than a throttle aperture of the first throttle.

4. The hydraulic system according to claim 2, wherein a throttle aperture of the second throttle is equal to a throttle aperture of the first throttle.

5. The hydraulic system according to claim 1, wherein a throttle aperture of the second throttle is larger than a throttle aperture of the first throttle.

6. The hydraulic system according to claim 1, wherein a throttle aperture of the second throttle is equal to a throttle aperture of the first throttle.

7. A work machine comprising:
a motor;
a drive device to be driven by the motor;
a brake to be actuated by an operation fluid to brake the motor when a hydraulic pressure is relieved and to release the braking when the hydraulic pressure is applied;
a switch valve to be switched to a first position and to a second position, the first position being provided for relieving the hydraulic pressure from the brake, the second position being provided for applying the hydraulic pressure to the brake;
a first fluid tube to connect the switch valve and the brake;
a second fluid tube connected to the first fluid tube at a connecting portion and communicated with a tank;
a first throttle disposed on the second fluid tube; and
a second throttle disposed on the first fluid tube and on an upstream side between the connecting portion and the switch valve.

8. The work machine according to claim 7, wherein the second throttle is disposed near the connecting portion.

9. The work machine according to claim 8, wherein a throttle aperture of the second throttle is larger than a throttle aperture of the first throttle.

10. The work machine according to claim 8, wherein a throttle aperture of the second throttle is equal to a throttle aperture of the first throttle.

11. The work machine according to claim 7, wherein a throttle aperture of the second throttle is larger than a throttle aperture of the first throttle.

12. The work machine according to claim 7, wherein a throttle aperture of the second throttle is equal to a throttle aperture of the first throttle.

13. The work machine according to claim 7, comprising a machine body, wherein
the drive device is disposed on the machine body.

14. The work machine according to claim 13, comprising:
an engine;
a hydraulic pump to be driven by the engine; and
a hydrostatic continuously variable transmission to drive the drive device, the hydrostatic continuously variable transmission including the motor and a hydraulic pump.

15. A hydraulic system comprising:
a motor;
a brake to be actuated by an operation fluid to brake the motor when a hydraulic pressure is relieved and to release the braking when the hydraulic pressure is applied;
a switch valve to switch between a first flowing path through which the hydraulic pressure is relieved from the brake and a second flowing path through which the hydraulic pressure is applied to the brake;
a first fluid tube to connect the switch valve and the brake;
a second fluid tube connected to the first fluid tube at a connecting portion and communicated with a tank;
a first throttle disposed on the second fluid tube; and
a second throttle disposed on the first fluid tube and on an upstream side between the connecting portion and the switch valve.

16. The hydraulic system according to claim 15, wherein the second throttle is disposed near the connecting portion.

17. The hydraulic system according to claim 16, wherein a throttle aperture of the second throttle is larger than a throttle aperture of the first throttle.

18. The hydraulic system according to claim 16, wherein a throttle aperture of the second throttle is equal to a throttle aperture of the first throttle.

19. The hydraulic system according to claim 15, wherein a throttle aperture of the second throttle is larger than a throttle aperture of the first throttle.

20. The hydraulic system according to claim 15, wherein a throttle aperture of the second throttle is equal to a throttle aperture of the first throttle.

\* \* \* \* \*